United States Patent [19]

Shinozaki

[11] 4,205,425
[45] Jun. 3, 1980

[54] METHOD FOR MANUFACTURING A DIAMOND TOOL

[75] Inventor: Eiichi Shinozaki, Chofu, Japan

[73] Assignee: Fuji Dia Co., Ltd., Tokyo, Japan

[21] Appl. No.: 887,712

[22] Filed: Mar. 17, 1978

[30] Foreign Application Priority Data

Jun. 18, 1977 [JP] Japan .................................. 52-72496
Jun. 18, 1977 [JP] Japan .................................. 52-72497

[51] Int. Cl.² ............................................. B22F 7/00
[52] U.S. Cl. ........................................ 29/420; 75/226; 75/208 R
[58] Field of Search ................ 75/226, 208 R; 29/420

[56] References Cited
U.S. PATENT DOCUMENTS

| | | | |
|---|---|---|---|
| 1,895,926 | 1/1933 | Hoyt | 75/226 X |
| 1,904,049 | 4/1933 | Hoyt | 75/226 X |
| 1,950,355 | 3/1934 | De Bats | 75/226 X |
| 2,299,207 | 10/1942 | Bevillard | 75/226 X |
| 2,476,421 | 7/1949 | Lake | 75/226 X |

Primary Examiner—Francis S. Husar
Assistant Examiner—V. K. Rising

Attorney, Agent, or Firm—Birch, Stewart, Kolasch & Birch

[57] ABSTRACT

A method for manufacturing a diamond tool having a shank, comprising accurately arranging a diamond chip on an upper surface of a base body in such a manner that the cutting edge of the chip projects from the end of the body by a predetermined distance, provisionally securing the chip to the upper surface of the body by means of an adhesive, fitting the body and an insert having an exposed clayish fixture in a U-shaped channel of a lower die to penetrate and position the cutting edge portion of the chip into the fixture of the insert, passing an upper die against the lower die after the fixture is cured, charging a predetermined amount of powder metals into a vertical hole formed in the upper die, pressurizing the powder metals by a press rod which is inserted in the vertical hole while heating the upper and lower dies in order to sinter the powder metals on the upper surface of the body and in the U-shaped channel of the lower die, thereby to rigidly fix the chip to the body, and shaping the body so as to provide a desired form of a shank.

5 Claims, 10 Drawing Figures

METHOD FOR MANUFACTURING A DIAMOND TOOL

BACKGROUND AND SUMMARY OF THE INVENTION

Diamond tools such as a diamond lath tool, comprising a shank formed with a mounting hole in which a diamond tip is inserted and secured therein, are well known. A diamond tool comprising a shank A provided, at its front end, with a generally L-shaped groove having a recess in which a diamond chip B is fitted, as shown in FIGS. 9 and 10, is also well known. The diamond chip B is covered and held by a cover C (FIGS. 9 and 10) while being observed by a projector and the like to accurately extend the chip by a predetermined amount.

The cover C is first secured to the shank A by means of a set screw D and is then bonded by means of a sintered metal E (FIGS. 9 and 10) to the recess. Thus the chip is rigidly fixed to the shank. The manufacture of the above mentioned, known, diamond tools requires a number of operations and a skilled operator. In addition, the diamond chip tends to shift in or separate from the mounting hole or the mounting recess, particularly in the case of bonding the chip with the use of a sintered metal. Furthermore, it is very difficult to manufacture a diamond tool having the necessary accuracy in the order of one-hundredth or one-thousandth of a millimeter.

In the case of a second type of diamond tool comprising a diamond chip held by a cover, the necessity of the cover increases the dimension of the shank. This drawback presents the serious problem that the diamond tools come into touch with one another in an automatic cutting machine including a number of tools and that chips produced during the cutting operation are moved onto the upper side surface of the cover above the diamond chips and come in contact with the workpiece, resulting in damage to the surfaces of the workpiece.

Accordingly, the primary object of the present invention is to provide a reliable diamond tool which is simply, easily and inexpensively manufactured and which includes a diamond chip rigidly secured to a shank with high accuracy.

Another object of the present invention is to provide a reliable diamond tool which does not contain a cover, i.e., a diamond tool comprising a diamond chip having a cutting plane flush with a surface of the shank, which is simply, quickly, easily, and inexpensively manufactured, wherein the diamond chip can be rigidly secured to the shank with high accuracy.

BRIEF DESCRIPTION OF THE DRAWINGS

The present invention will become more fully understood from the detailed description given hereinbelow and the accompaying drawings which are given by way of illustration only, and thus are not limitative of the present invention, and wherein.

DESCRIPTION OF THE PREFERRED EMBODIMENTS

Figure 1:
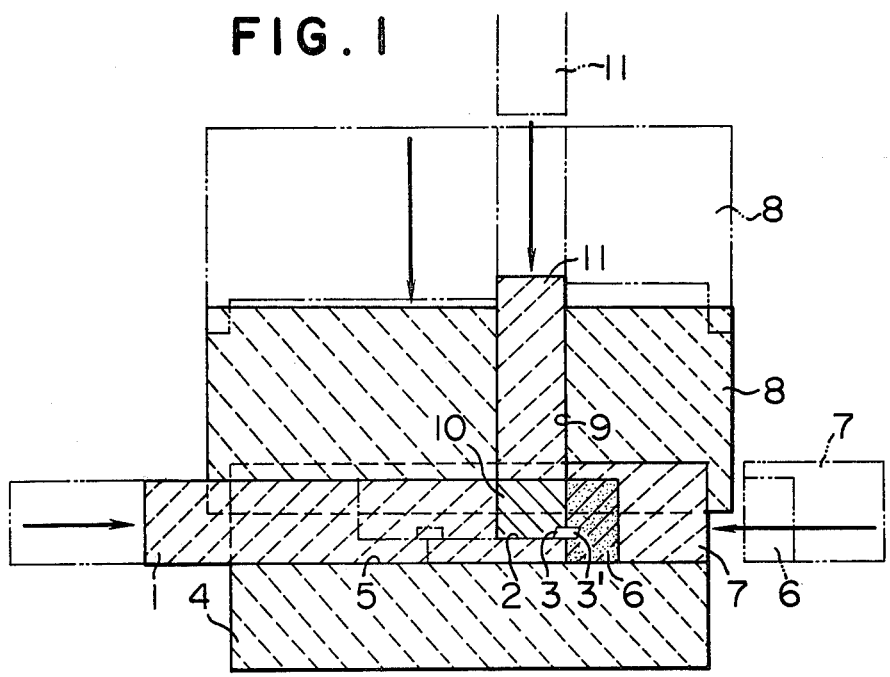
FIG. 1 is a longitudinal sectional view of dies used for manufacturing a diamond tool, according to one embodiment of the present invention.
Figure 2:
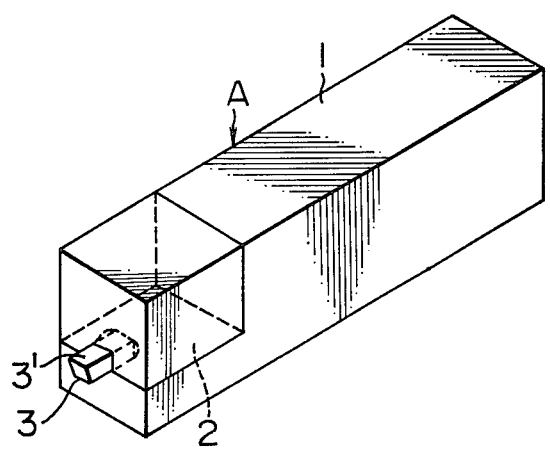
FIG. 2 is a perspective view of a shank manufactured by the method of FIG. 1.

With reference to FIGS. 1 and 2, the numeral 1 designates a square shank which serves as a base body and which is provided, at its front end, with a generally L-shaped rest portion 2. The surface of the rest portion 2 is roughly finished. A diamond chip 3 is disposed in place on the rest portion 2, e.g. on the front edge portion of the rest portion as shown in the drawings, and is then adjusted by a projector, a microscope, or a gauge so that the front end 3' of the chip 3 protrudes from the front edge line of the rest portion 2 by a predetermined length. The chip 3 is temporarily secured to the upper surface of the rest portion by means of an adhesive.

Then, in a U-shaped channel 5 of a lower die 4, the rest portion 2 of the base body 1 and an insert 7 filled with a clayish fixture 6 are fitted so that the cutting edge 3' of the chip 3 is placed in the fixture 6 of the insert 7.

The lower die is formed, at its center portion, with the U-shaped channel 5 having open ends. The width of the channel is such that the base body 1 is tightly fitted therein. In the channel 5 are inserted the rest portion 2 of body 1, a part of the body 1, and the insert 7. The insert 7 has an inverted L-shaped cross section which is filled with the clayish fixture 6 disposed therein so that the position of the fixture is flush with that of the insert 7. The insert 7 is slidably inserted in the channel 5 so that the cutting edge 3' of the chip 3 extends into the fixture 6.

Then, the fixture 6 is dried and cured to secure the cutting edge 3' of the chip 3 in the fixture. An upper die 8 is pressed against the lower die 4. The upper die 8 is provided with a vertical hole 9 which is positioned directly above the rest portion 2. A predetermined amount of a powder metal 10 is then charged into the hole 9.

The assembly of dies is then heated while pressurizing the powder metal with the help of a press rod 11 which is tightly inserted into the hole 9 of the upper die 8. The powder metal is thus sintered on the rest portion 2 to rigidly secure the tip 3 on the rest portion 2. The body 1 is removed from the dies 4 and 8 after cooling and the fixture 6 is then removed. The body 1 is finally ground to obtain a desired shank A.

Figure 3:
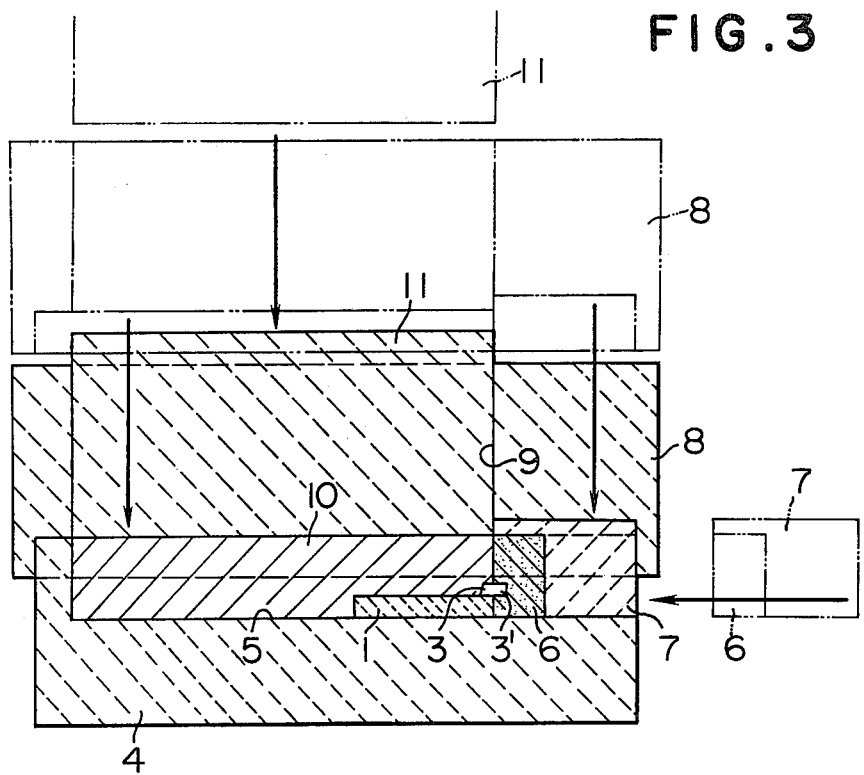
FIG. 3 is a view similar to FIG. 1, showing a second embodiment of the present invention.
Figure 4:
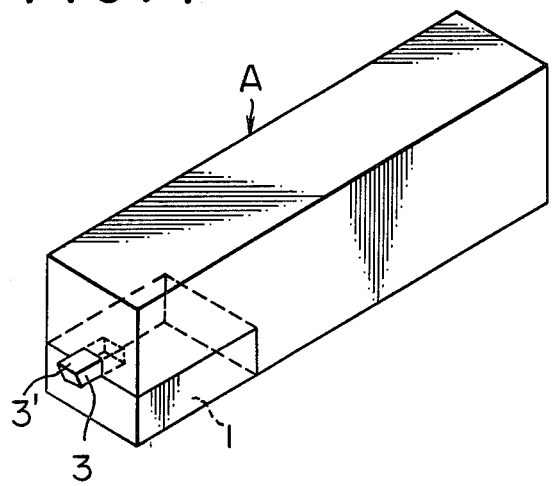
FIG. 4 is a perspective view of the shank manufactured by the method of FIG. 3.

In another embodiment shown in FIGS. 3 and 4, the body 1 serves as a part of a shank A which is mainly made of a sintered metal. The body 1 is in the form of small square plate or a plate having a length corresponding to that of a desired shank and has a roughly finished upper surface on which a diamond chip 3 is placed. The position of the diamond chip 3 is adjusted by a projector, a microscope or a gauge so that the cutting edge 3' of the chip 3 projects from the end of the body 1 by a predetermined length. After adjustment, the chip 3 is provisionally fixed by an adhesive onto the upper surface of the body 1.

The body 1 and the insert 7 having a clayish fixture 6 are inserted in the U-shaped channel 5 of the lower die 4 so that the cutting edge 3' of the tip 3 is pressed into the fixture 6. The U-shaped channel 5 in this embodiment is sightly different from the U-shaped channel 5 in the first embodiment shown in FIGS. 1 and 2. That is, the U-shaped channel 5 is such that the length thereof is slightly longer than that of a desired shank, and the width allows a tight fit of the body 1. The channel 5 has an open end and a closed end. The body 1 is in the channel 5 near the open end and the insert 7 is inserted in the channel 5 from the open end so that the cutting edge 3' of the chip 3 is pressed into the fixture 6.

The fixture 6 is then dried and cured so that the cutting edge 3' of the chip 3 is immovably fixed in the cured fixture. The upper die 8 is then pressed against the lower die 4 and a predetermined amount of a powder metal 10 is charged into a vertical hole 9 which has the same elongated rectangular shape and the same size as that of the desired shank A and which is provided in the upper die directly above the channel 5 of the lower die 4, thereby moulding the desired shank of the sintered metal. In the vertical hole 9 is tightly inserted a press rod 11 to pressurize the powder metal 10, while heating the upper and lower dies. The powder metal 10 is thus sintered in the channel 5, so that the chip 3 is rigidly fixed to the body 1.

After cooling, the sintered metal, rigidly secured to the body 1, is removed from the dies. Finally, the fixture 6 is removed from the body 1 and then is ground to obtain a desired shank A.

According to the present invention, it is possible to prevent the diamond chip from being accidentally removed during the manufacture of a desired shank, since the diamond chip is provisionally fixed to the body in the first portion of the manufacturing process.

Therefore, according to the present invention, a diamond tool can be manufactured with high precision. Furthermore, the manufacture of a diamond tool does not require a skilled operator since the tool can be completely manufactured, mechanically, once the diamond chip has been initially fixed to the body by hand. Thus, the diamond tool can be easily, inexpensively and quickly manufactured.

In addition, since the diamond chip is rigidly and reliably fixed to the body serving as the shank, there is no possibility of accidental displacement and/or separation of the diamond chip, thus resulting in the increase in the service life of the tool.

Figure 5:
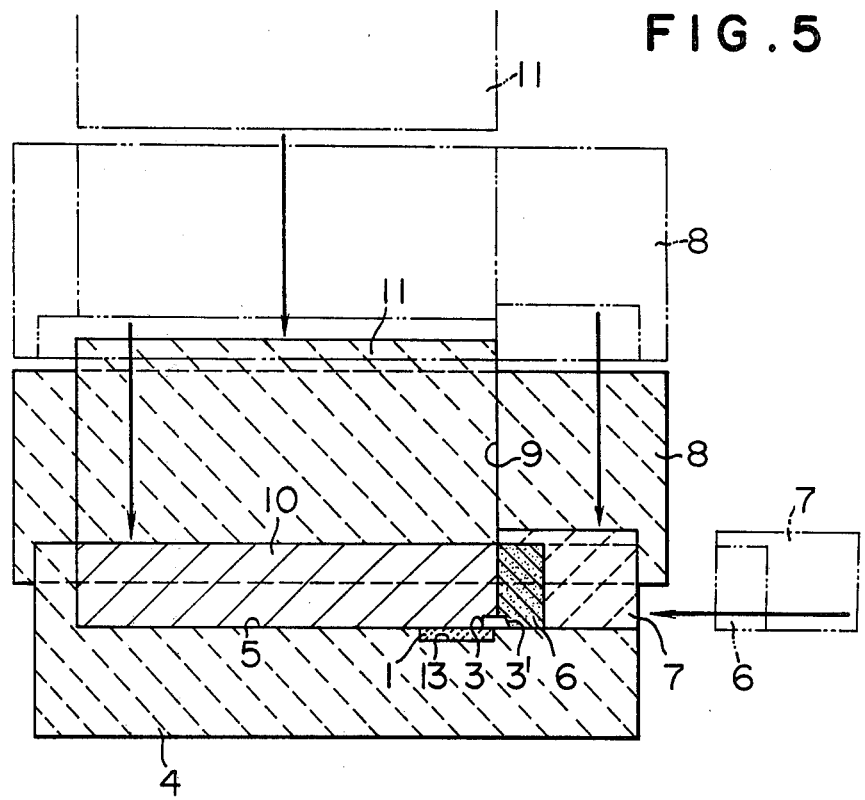
FIG. 5 is a view similar to FIG. 1, showing a third embodiment of the present invention.
Figure 6:
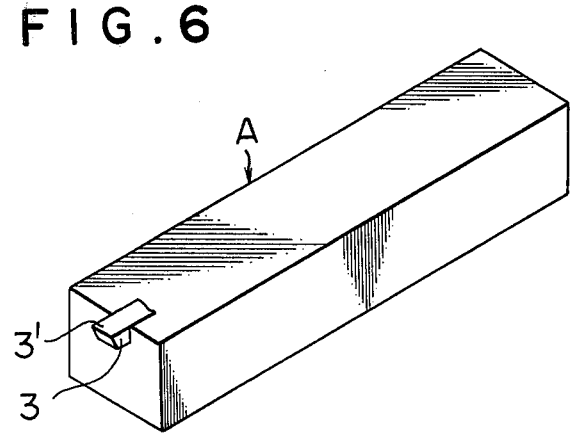
FIG. 6 is a perspective view of a shank manufactured by the method of FIG. 5.

FIGS. 5 and 6 show another embodiment of the present invention, wherein a diamond tool is produced in which the cutting surface of the chip is positioned flush with the surface of the shank. The body 1 is in the form of a small square plate and has a mirror-finished upper surface. The powder metal which is sintered on the mirror-finished surface can easily be removed.

A diamond chip 3 is positioned, in place, on the upper surface of the body (e.g. on the front portion of the upper surface, as seen in the drawings), and is then adjusted by a projector, a microscope, or a gauge so that the front end 3' of the chip 3 protrudes from the body 1 by a predetermined length, and is temporarily secured to the upper surface of the body 1 by means of an adhesive.

Then, in a recess 13 formed in a U shaped channel 5 of a lower die 3, the body 1 is fitted. An insert 7 provided with an exposed clayish fixture 6 is inserted from the end of the U shaped channel 5 so that the cutting edge 3' of the tip 3 is penetrated and placed in the fixture 6 of the insert 7. The lower die 4 is formed, at its center portion, with the U shaped channel 5 having an open end and a closed end. The length of the channel is longer than that of a desired shank. In the bottom portion of the open end of the channel 5 is formed a U-shaped recess 13 in which the body 1 is tightly fitted. The insert 7 has an inverted L-shaped cross section and is filled with the exposte clayish fixture 6 therein so that the plane of the fixture is flush with that of the end face of the insert 7.

The body 1 is fitted in the U shaped recess 13 of the U-shaped channel 5. The diamond chip 3 is placed on the body 1 in such a way that the cutting edge 3' faces the open end of the channel 5. The insert 7 is inserted in the channel 5 from the open end of the latter so that the cutting edge 3' of the chip 3 penetrates and extends into the fixture 6 of the insert 7.

Then, the fixture 6 is dried and cured to secure the cutting edge 3' of the chip 3 in said fixture. An upper die 8 is pressed against the lower die 4. The upper die 8 is provided with an elongated rectangular vertical hole 9 which is generally of the same shape as the desired shank and is positioned above the U-shaped channel 5 of the lower die 4. A predetermined amount of powder metal 10 is then charged into the hole 9.

The die assembly is heated while pressurizing the powder metal with the help of a press rod 11 which is tightly inserted into the hole 9. The powder metal 10 is thus sintered in the channel 5 to rigidly secure the tip 3 to the sintered metal. The sintered metal to which the body 1 is fixed is removed from the dies 4 and 8 after cooling and the fixture 6 and the body 1 are then removed. The sintered metal is finally ground to obtain a desired shank A.

Figure 7:
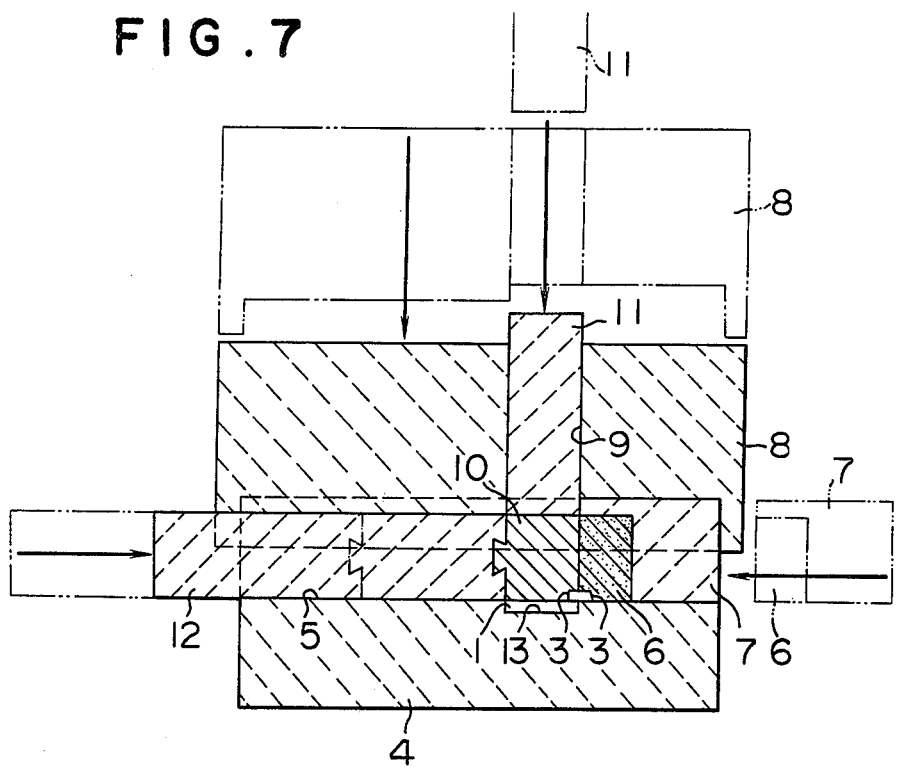
FIG. 7 is a view similar to FIG. 1, showing a fourth embodiment of the present invention.
Figure 8:
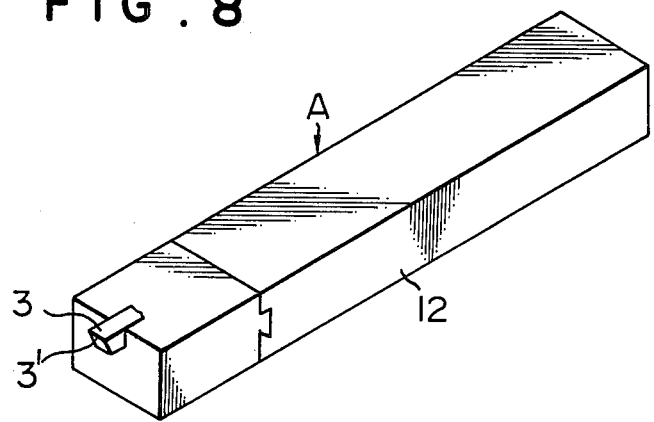
FIG. 8 is a perspective view of a shank manufactured by the method of FIG. 7.
Figure 9:
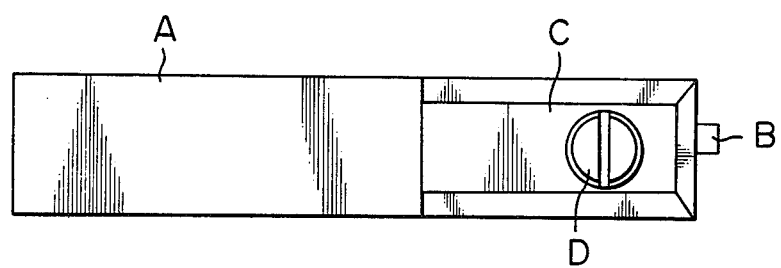
FIG. 9 is a plan view of a shank manufactured by a conventionally known method.
Figure 10:
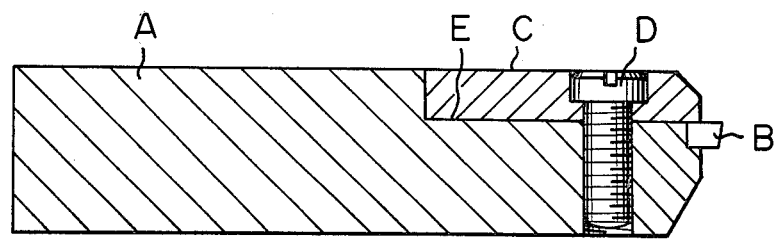
FIG. 10 is a longitudinal sectional view of FIG. 9.

FIGS. 7 and 8 show still another embodiment of the present invention, directed to a diamond tool, in which the shank is not wholly made of a sintered metal but consists of a shank rod 12 made of another material. To the front end of the shank rod is rigidly secured a diamond chip 3 through a sintered metal.

In this fourth embodiment, the diamond chip 3 is provisionally secured to the body 1 and the body 1 is then fitted in the U-shaped recess 13 formed in the U-shaped channel 5 of the lower die 4, in the same manner as the above-mentioned third embodiment shown in FIGS. 5 and 6. The difference between the third embodiment and the fourth embodiment resides in the construction of the U-shaped channel 5 of the lower die 4.

The lower die 4 is provided at its center portion, with a U-shaped channel 5, the width of which is such that the shank rod 12 is tightly fitted therein. The opposite ends of the channel 5 are open ends. In the channel 5 are inserted the shank rod 12 from the one open end of the channel, and the insert 7, including the exposed clayish fixture 6, from the other end of the channel so that the cutting edge 3' of the chip 3 penetrates and extends into the fixture 6 of the insert 7.

Then, the fixture 6 is dried and cured to secure the cutting edge 3' of the chip 3 in the fixture. An upper die 8 is then pressed against the lower die 4. A predetermined amount of powder metal 10 is fed into the vertical hole 9 which is formed in the upper die 8 directly above the body 1. The die assembly is then heated while pressurizing the powder metal with the help of a press rod 11 which is tightly inserted into the hole 9 of the upper die 8. The powder metal is thus sintered to rigidly secure the tip 3 and the shank rod 12 to the sintered metal. They are then removed from the dies 4 and 8 after cooling and the fixture 6 and the body 1 are removed from the sintered metal. The sintered metal is finally ground to obtain a desired shank A.

According to the present invention, it is possible to prevent the diamond chip from being accidentally moved during the manufacture of the desired shank since the diamond chip is provisionally fixed to the body in the first portion of the manufacturing process. Therefore, a diamond tool can be manufactured with high precision.

Futhermore, since the diamond chip can be secured to the shank in such a way that the cutting edge surface of the diamond chip is flush with the upper surface of the shank, the tool is smaller in its width than a tool comprising a chip covered by a cover. As a result, it is possible to prevent the tools from contacting each other when they are incorporated in an automatic cutting machine, and also to prevent surfaces of a work-piece from being damaged by cut chips which can be caused during the cutting operation.

Further, the manufacture of the diamond tool, according to the present invention, does not require a skilled operator since the tool can be mechanically manufactured once the diamond chip is provisionally fixed to the body by hand. Thus, the tool can be easily, inexpensively and quickly manufactured.

In addition, since the diamond chip is rigidly and reliably fixed to the body serving as the shank, there is no possibility of accidental displacement and separation of the diamond chip, resulting in an increase in the service life of the tool. Furthermore, since the cutting surface of the chip is flush with the upper surface of the chip, the chip can be ground and repaired while being mounted to the shank without dismounting the chip from the shank. The chip otherwise tends to be damaged when it is dismounted from the shank. Thus, useful life of an expensive diamond chip is increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for manufacturing a diamond tool having a shank, comprising: accurately arranging a diamond chip on an upper surface of a base body in such a manner that the cutting edge of the chip projects from the end of the body by a predetermined distance, provisionally securing the chip to the upper surface of the body by means of an adhesive, fitting said body and an insert having an exposed clayish fixture in a U-shaped channel of a lower die, causing the cutting edge portion of the chip to penetrate into and position itself within the fixture of the insert, curing the fixture, and thereafter passing an upper die against the lower die, charging a predetermined amount of powder metals into a vertical hole formed in the upper die, pressurizing the powder metals by a press rod which is inserted in the vertical hole while heating the upper and lower dies, in order to sinter the powder metals on the upper surface of the body and in the U-shaped channel of the lower die, thereby rigidly fixing the chip to the body, and shaping the body so as to provide a desired form of a shank.

2. The method according to claim 1, wherein the base body is in the form of a square rod forming a shank.

3. The method according to claim 1, wherein the base body is in the form of a small plate forming a part of a shank.

4. The method for manufacturing a diamond tool having a shank, comprising accurately arranging a diamond chip on an upper surface of a base body in the form of a small plate in such a manner that the cutting edge of the chip projects from the end of the body by a predetermined length, provisionally securing the chip to the upper surface of the body by means of an adhesive, fitting said body in a U-shaped recess formed in a U-shaped channel of a lower die, inserting an insert having an exposed clayish fixture in the U-shaped channel causing the cutting edge portion of the chip to penetrate into the fixture of the insert, curing the fixture and thereafter pressing an upper die against the lower die, charging a predetermined amount of metal powder into a vertical hole formed in the upper die, pressurizing the powder metals by a press rod which is inserted into the vertical hole while heating the upper and lower dies, in order to sinter the powder metals, thereby rigidly fixing the chip to the sintered metal, removing the base body from the sintered metal, and shaping the sintered metal so as to provide a desired form of a shank.

5. A method according to claim 4, wherein after the base body in the form of a small plate is fitted in the U-shaped recess formed in the U-shaped channel of the lower die, a shank rod is inserted into the channel from the other open end thereof, so that the cutting edge portion of the chip penetrates into the fixture, the powder metals are then sintered to rigidly fix the chip and the shank rod to the sintered metal, the base body is then removed from the sintered metal, and finally the sintered metal is shaped to provide the desired form of a shank.

* * * * *